Patented May 14, 1940

2,200,324

UNITED STATES PATENT OFFICE 2,200,324

VAT DYESTUFFS OF THE ANTHRAQUINONE SERIES

Erich Berthold and Joachim Mueller, Ludwigshafen-on-the-Rhine, Germany, assignors to General Aniline & Film Corporation, a corporation of Delaware No Drawing. Application November 19, 1938, Serial No. 241,338. In Germany February 1, 1934

5 Claims. (Cl. 260—276)

The present invention relates to vat dyestuffs of the anthraquinone series. This application is a continuation in part of our application Ser. No. 3,190, filed January 23, 1935.

We have found that valuable dyestuffs of the anthraquinone series are obtained by preparing amino anthraquinone thiazoles having the general formula

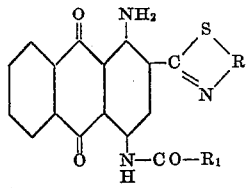

wherein R stands for an anthraquinone radical and $R_1$ for a radical selected from the class consisting of anthraquinone acridone and anthraquinone thioxanthone, a ring of the said nuclear radical being directly combined with the CO-group.

A great variety of methods may be employed for the preparation of the dyestuffs according to this invention. Thus, for example, the dyestuff having the formula

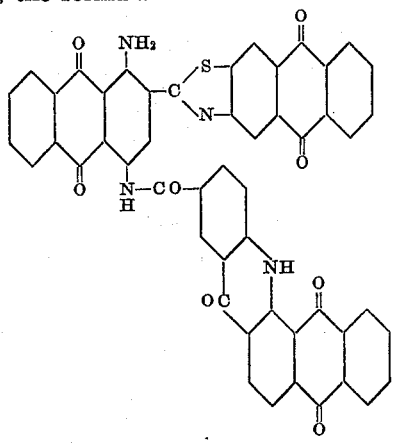

may be prepared as follows:

1-amino-4-nitro- or 1-amino-4-halogenanthraquinone - 2 - carbonylamino-2'.3'-halogenanthraquinone (obtainable by condensation of 1-amino-4-nitro- or 1-amino-4-halogenanthraquinone-2-carboxylic acid chloride with 2-amino-3-halogenanthraquinone) is converted by reduction or by heating with ammonia or by reaction with paratoluene-sulfamide and subsequent saponification into 1.4-diamino-2-carbonylamino-2'.3'-halogenanthraquinone; by treatment with sodium sulfide and sulfur in phenol the 1.4-diamino-2-anthraquinonyl-2'.3'-anthraquinone-thiazole is formed which latter may also be obtained by treatment of 1.4-diaminoanthraquinone-2-carbonylamino-2'.3'-halogen-anthraquinone with sodium disulfide in pyridine and then the thus obtained 1.4-diaminoanthraquinone - 2 - carbonylamino-2'.3'-mercaptoanthraquinone with an acid condensing agent such as sulfuric acid or para-toluenesulfonic acid in order to effect the ring closure.

Another method for preparing the said thiazole consists in condensing 1-amino-4-nitro- or 1-amino-4-halogen - anthraquinone-2-carboxylic acid chloride with 2-amino-3-mercaptoanthraquinone in nitrobenzene and converting the thus obtained 1-amino-4-nitro- or 1-amino-4-halogen - 2-anthraquinonyl-2'.3'-anthraqninonethiazole by reduction or by heating with ammonia or by reaction with para-toluene-sulfamide and subsequent saponification into the said 1.4-diamino-2-anthraquinonyl-2'.3'-anthraquinonethiazole.

Furthermore, 1-amino-4-nitro- or 1-amino-4-halogen-anthraquinone-2-aldehyde may be reacted in concentrated sulfuric acid with 2-amino-3-mercaptoanthraquinone and the thus obtained 1-amino-4-nitro- or 1-amino-4-halogenanthraquinonyl-2'.3' - anthraquinonethiazole converted by abovementioned methods into the 1.4-diamino-2-anthraquinonyl - 2'.3' - anthraquinonethiazole.

Finally, the said thiazole may also be obtained by nitration of 1-amino-2-anthraquinonyl-2'.3'-anthraquinonethiazole and subsequent reduction of the resulting nitro compound.

The 1.4-diamino-2-anthraquinonyl - 2'.3'-anthraquinonethiazole obtained according to one of the methods as described is then converted into the dyestuff having the formula mentioned above by acting thereon with the chloride of anthraquinone - 2(N).1 - 1'(N).2'- benzacridone-5'-carboxylic acid.

Other vat dyestuffs of the said kind may be prepared in an analogous manner.

Thus for example the chlorides or bromides of the following acids may be employed instead of the anthraquinone - 1(N).2-2'(N).1'- benzacridone-5'-carboxylic acid: anthraquinone-1(N).-2-2'(N)1' - benzacridone-3'- or 6' - carboxylic acid, anthraquinone - 2(N).3-1'(N)2' - benzacridone-3'- or -5'- or -6'-carboxylic acid, an anthraquinone - 1(S).2-2'(S)1' - benzthioxanthone-carboxylic acid, an anthraquinone-2(S).1-1'(S).-2'-benzthioxanthone carboxylic acid and an anthraquinone - 2(S).3-2'(S)1' - benzthioxanthone-carboxylic acid.

The vat dyestuffs thus obtainable have good properties as regards fastness, dye vegetable fibres usually in red to green shades depending on the used carboxylic acid and the employed 2-anthraquinonyl-anthraquinonethiazole.

The following examples will further illustrate how the said invention may be carried out in practice but the invention is not restricted to these examples. The parts are by weight

Example 1

A mixture of 12.5 parts of 1.4-diamino-2-anthraquinonyl - 2'.3'-anthraquinonethiazole (obtainable for example by reacting 1-amino-4-nitroanthraquinone-2-carboxylic acid chloride with 2-amino-3-chloranthraquinone and heating the thus formed 1-amino-4-nitroanthraquinone-2-carbonylamino-2'.3'-chloranthraquinone with sodium sulfide and sulfur in phenol), 11 parts of anthraquinone-1(N).2-2'(N).1'-benzacridone-5'-carboxylic acid chloride and 250 parts of nitrobenzene is heated at from 180° to 190° C. until initial material is no longer detectable. After working up, a dyestuff is obtained in the form of bluish grey crystals which dissolve in concentrated sulfuric acid giving a brown yellow coloration and which dyes vegetable fibres from a violet vat strongly neutral grey shades of excellent fastness properties.

By employing anthraquinone-1(N).2-2'(N)1'-benzacridone-3'- or -6'-carboxylic acid chloride there are obtained dyestuffs which dye cotton from reddish violet vats bluish grey and reddish grey shades respectively.

Example 2

A mixture of 50 parts of 1.4-diamino-2-anthraquinonyl-2'.3'-anthraquinonethiazole, 44 parts of anthraquinone - 2(S)1 - 1'(S)2'-benzthioxanthone-3'-carboxylic acid chloride and 1000 parts of nitrobenzene is heated at from 180° to 190° C. until initial material is no longer detectable. After working up, a dyestuff is obtained in the form of a grey crystal powder which dissolves in concentrated sulfuric acid giving a yellowish red coloration and which dyes cotton from a violet vat greyish blue shades of excellent fastness properties.

By employing anthraquinone-1(S).2-2'(S).1'-benzthioxanthone-3'-carboxylic acid chloride a dyestuff is obtained which dyes cotton from a violet vat bluish grey shades; with anthraquinone -2(S).3-2'(S).1'-benzthioxanthone-3'-carboxylic acid chloride a dyestuff is obtained which dyes cotton from a violet vat olive-grey shades of good fastness properties.

Example 3

A mixture of 10 parts of 1.4-diamino-2-anthraquinonyl-1'(S).2'(N)-anthraquinonethiazole (obtainable, for example, by reacting 1-amino-4-nitro-anthraquinone-2-carboxylic acid chloride with 1 - chlor-2-amino-anthraquinone, heating the thus obtained 1-amino-4-nitroanthraquinone - 2 - carbonyl - 2'-amino-1'-chloranthraquinone with sodium sulfide and sulfur in pyridine, whereby the 1.4-diamino-2-carbonyl-2'-amino-1'-mercaptoanthraquinone is obtained, the ring closure is then effected by treating this substance in concentrated sulfuric acid at about 100° C.), 9 parts of anthraquinone - 1(N).2-2'(N).1'-benzeneacridone-5'-carboxylic acid chloride and 300 parts of nitrobenzene is treated while stirring, at about 150° C. until hydrochloride acid is no longer split off, the temperature is then raised at from 180° C. to 190° C. and the mixture is kept at this temperature until initial material is no longer detectable. After working up in the usual manner a violet crystal powder is obtained which dissolves in concentrated sulfuric acid giving an olive coloration and which dyes vegetable fibres from a violet vat reddish grey shades of good fastness properties.

By employing 1.4-diamino - 2-anthraquinoyl-1'(N).2'(S)-anthraquinonethiazole a dyestuff is obtained which dyes cotton from a bluish violet vat fast olive-grey shades.

Similar dyestuffs are obtained using chlorides of other anthraquinone acridone carboxylic acids instead of the anthraquinone-2(N).2-2'(N).1'-benzacridone-5'-carboxylic acid chloride.

What we claim is:

1. Vat dyestuffs of the general formula

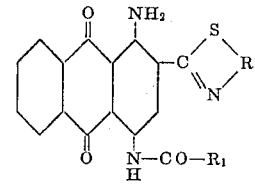

wherein R stands for an anthraquinone radical and R₁ for a radical selected from the class consisting of anthraquinone benzacridone and anthraquinonebenzthioxanthone, the benzene nucleus of the said radical being directly combined with the CO-group.

2. Vat dyestuffs of the general formula

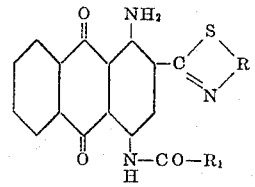

where R stands for an anthraquinone radical and R₁ for an anthraquinone benzacridone radical, the benzene nucleus of the said radical being directly combined with the CO-group.

3. Vat dyestuffs of the general formula

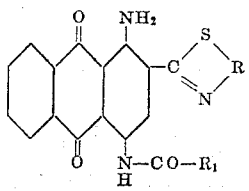

wherein R stands for an anthraquinone radical and $R_1$ for an anthraquinone-1(N).2-2'(N)1'-benzacridone radical, the benzene nucleus of the said radical being directly combined with the CO-group.
4. The vat dyestuff of the formula
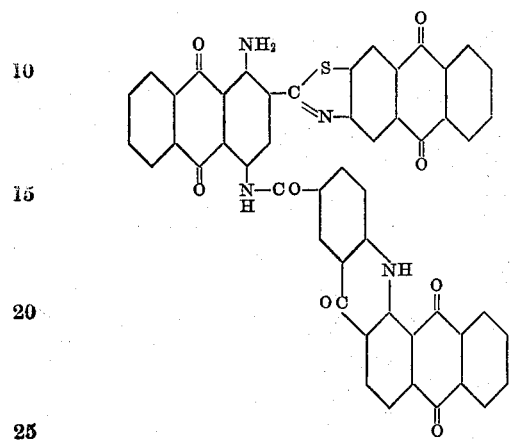
5. The vat dyestuff of the formula
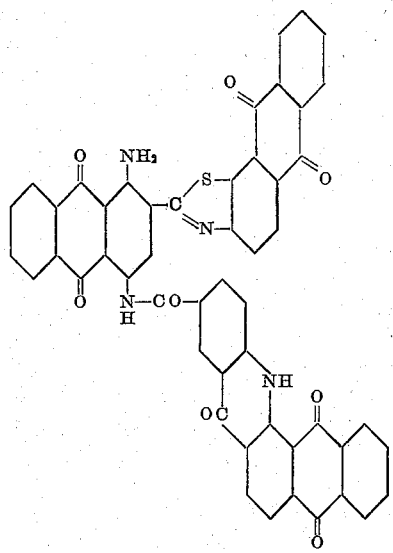
ERICH BERTHOLD.
JOACHIM MUELLER.